United States Patent
Takeda et al.

(10) Patent No.: US 11,272,518 B2
(45) Date of Patent: Mar. 8, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Keisuke Saito, Tokyo (JP); Kazuaki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 15 days.

(21) Appl. No.: 16/629,845

(22) PCT Filed: Jul. 13, 2017

(86) PCT No.: PCT/JP2017/025613
§ 371 (c)(1),
(2) Date: Jan. 9, 2020

(87) PCT Pub. No.: WO2019/012670
PCT Pub. Date: Jan. 17, 2019

(65) Prior Publication Data
US 2021/0084663 A1 Mar. 18, 2021

(51) Int. Cl.
*H04W 72/08* (2009.01)
*H04L 5/00* (2006.01)
*H04W 56/00* (2009.01)
*H04W 72/00* (2009.01)
*H04W 72/04* (2009.01)

(52) U.S. Cl.
CPC ......... *H04W 72/085* (2013.01); *H04L 5/0051* (2013.01); *H04W 56/001* (2013.01); *H04W 72/005* (2013.01); *H04W 72/0446* (2013.01)

(58) Field of Classification Search
CPC . H04L 5/0051; H04L 5/0096; H04L 27/2613; H04L 27/26; H04L 27/2602; H04W 56/001; H04W 72/005; H04W 72/085; H04W 72/0446
See application file for complete search history.

(56) References Cited

U.S. PATENT DOCUMENTS

2012/0051404 A1* 3/2012 Hu .................. H04L 5/0048
375/211
2013/0201975 A1 8/2013 Chen et al.
(Continued)

FOREIGN PATENT DOCUMENTS

JP 2015-508255 A 3/2015

OTHER PUBLICATIONS

International Search Report issued in PCT/JP2017/025613 dated Oct. 17, 2017 (2 pages).
(Continued)

*Primary Examiner* — Brian D Nguyen
(74) *Attorney, Agent, or Firm* — Osha Bergman Watanabe & Burton LLP

(57) ABSTRACT

A terminal is disclosed that includes a receiver that receives a specified signal including a synchronization signal and a broadcast channel and a controller that controls a reception of a demodulation reference signal for a downlink shared channel while assuming that the demodulation reference signal does not collide with the specified signal. In other aspects, a radio communication method for a terminal is also disclosed.

6 Claims, 12 Drawing Sheets

(56) References Cited

U.S. PATENT DOCUMENTS

| | | | | |
|---|---|---|---|---|
| 2015/0223211 | A1* | 8/2015 | Seo | H04L 5/0048 370/329 |
| 2015/0263839 | A1* | 9/2015 | He | H04W 8/06 370/329 |
| 2016/0374059 | A1* | 12/2016 | Park | H04L 27/0006 |
| 2019/0158263 | A1* | 5/2019 | Lee | H04L 5/006 |
| 2019/0373597 | A1* | 12/2019 | Bendlin | H04W 72/0413 |

OTHER PUBLICATIONS

Written Opinion of the International Searching Authority issued in PCT/JP2017/025613 dated Oct. 17, 2017 (3 pages).
Huawei, HiSilicon; "Unified design for slot and mini-slot"; 3GPP TSG RAN WG1 89 Meeting, R1-1708121; Hangzhou, China; May 15-19, 2017 (8 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 Meeting #89; R1-1708979 "Impact on eMBB DMRS puncturing by URLLC burst" WILUS Inc.; Hangzhou, P.R. China; May 15-19, 2017 (6 pages).
3GPP TSG RAN WG1 Meeting #84bis; R1-162505 "Reference signal for sPDSCH demodulation" LG Electronics; Busan, Korea; Apr. 11-15, 2016 (9 pages).
3GPP TSG RAN WG1 Meeting #89; R1-1707193 "Uplink multiplexing for different transmission duration" ZTE; Hangzhou, P.R. China; May 15-19, 2017 (5 pages).
3GPP TSG RAN WG1 Meeting #90; R1-1713407 "Discussion on DL DMRS design" Qualcomm Incorporated; Prague, Czech Republic; Aug. 21-25, 2017 (13 pages).
Extended European Search Report issued in European Application No. 17917772.0, dated Jan. 19, 2021 (10 pages).
Office Action issued in the counterpart Japanese Patent Application No. 2019-529408, dated Sep. 7, 2019 (8 pages).

* cited by examiner

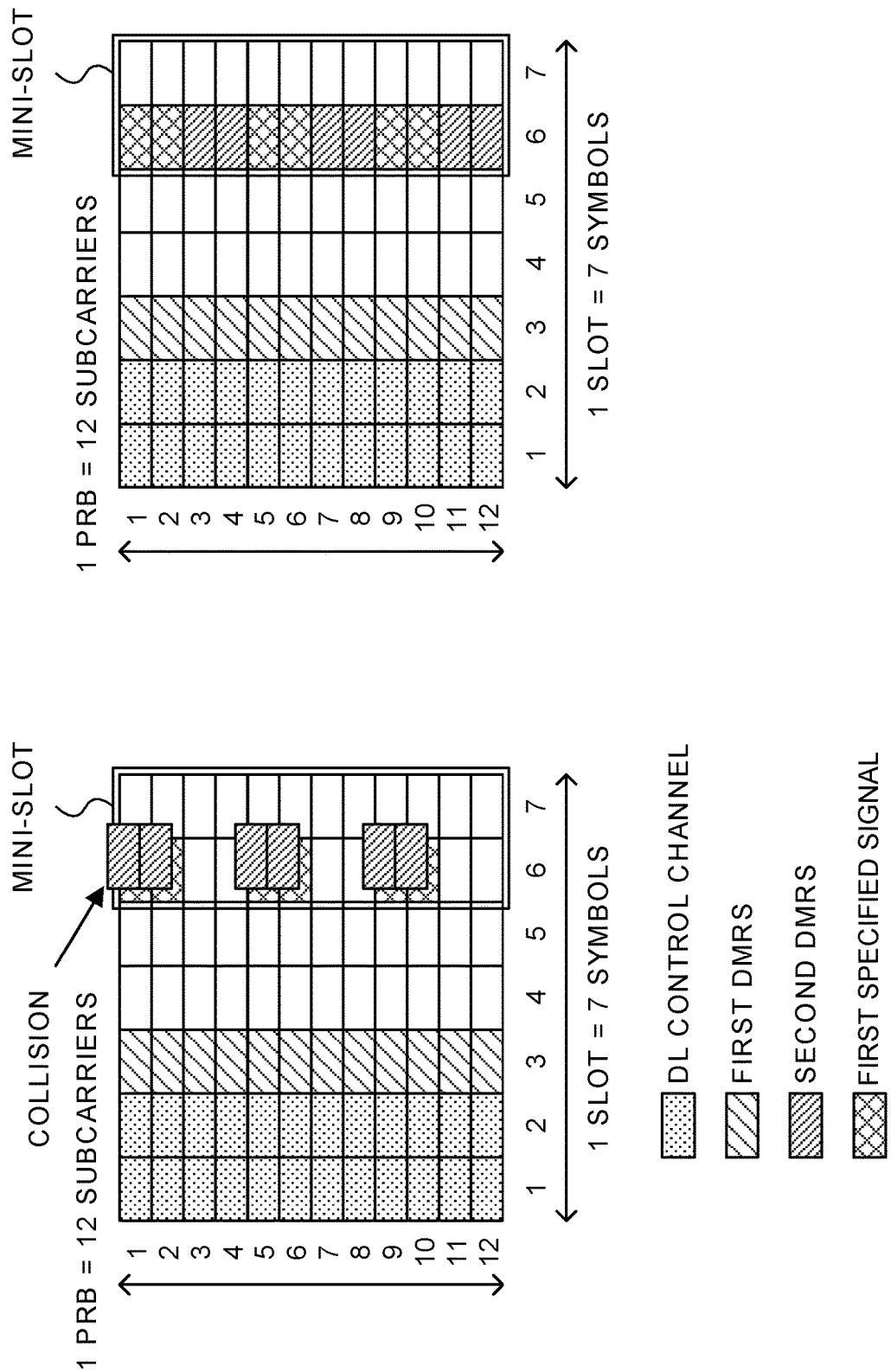

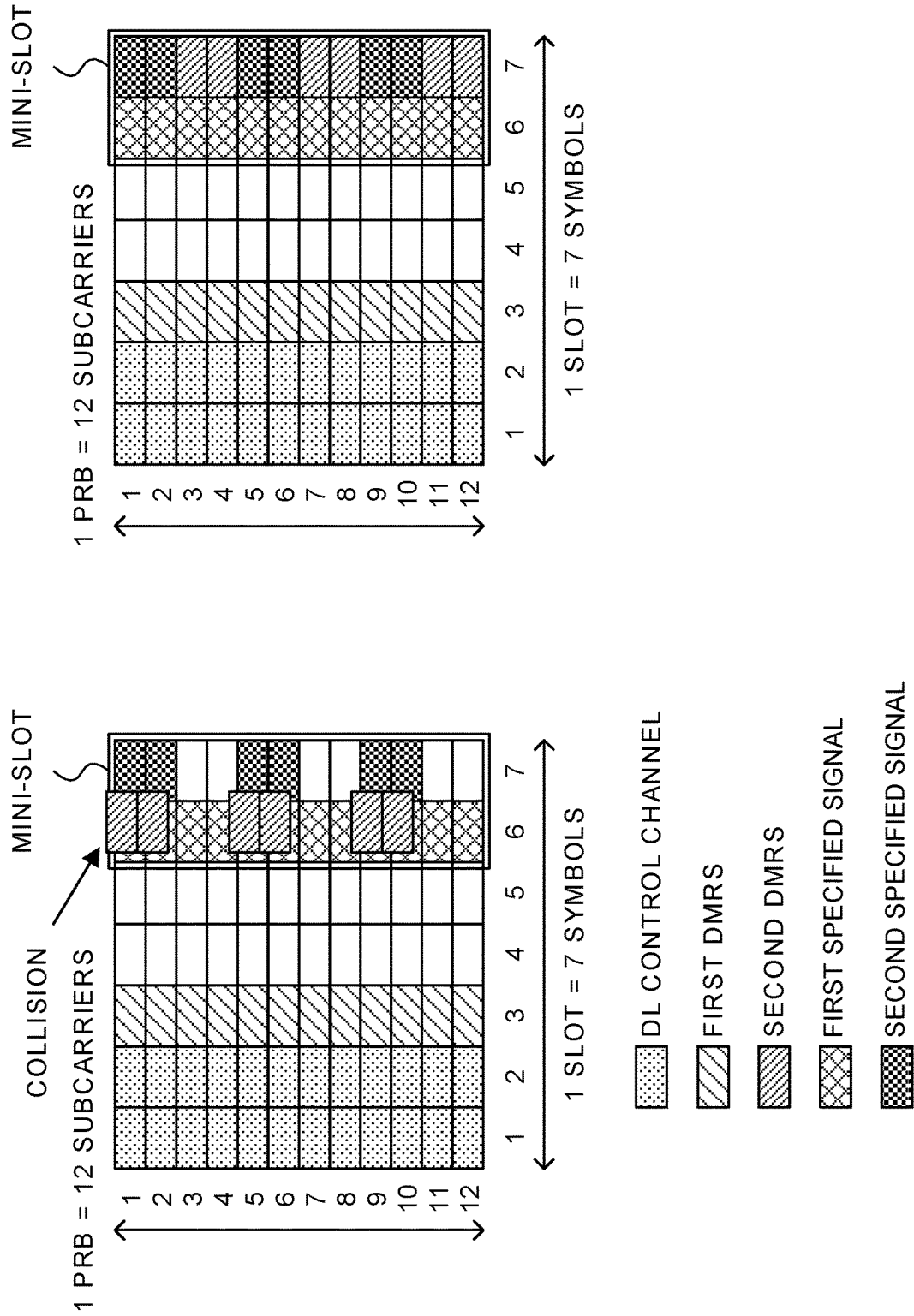

ND RADIO
USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE (also referred to as LTE Rel.8 or 9), LTE-A (LTE-Advanced, also referred to as LTE Rel.10, 11 or 12) has been specified, and successor systems (e.g., also referred to as FRA (Future Radio Access), 5G (5th generation mobile communication system), 5G+ (plus), NR (New Radio), NX (New radio access), FX (Future generation radio access), LTE Rel.13, 14 or 15 onward and the like) to LTE have also been studied.

In the existing LTE system (e.g., LTE Rel.8-13), downlink (DL) and/or uplink (UL) communication is performed, using a subframe of 1 ms (also referred to as Transmission Time Interval (TTI), etc.) The subframe is a transmission time unit of one data packet subjected to channel coding, and is a processing unit of scheduling, link adaptation, retransmission control (HARQ: Hybrid Automatic Repeat reQuest) and the like.

A radio base station controls scheduling of data to a user terminal, and using downlink control information (DCI), notifies the user terminal of the scheduling of data. Based on the DCI, the user terminal controls reception of DL data and/or transmission of UL data. Specifically, based on DCI, the user terminal performs reception of downlink data in the same subframe as that of the DCI and/or transmission of uplink data in a subframe a predetermined period later (e.g., 4 ms).

CITATION LIST

Non Patent Literature

[Non-patent Document 1] 3GPP TS 36.300 V.8.12.0 "Evolved Universal Terrestrial Radio Access (E-UTRA) and Evolved Universal Terrestrial Radio Access Network (E-UTRAN); Overall description; Stage 2 (Release 8)", April, 2010

DISCLOSURE OF INVENTION

Technical Problem

In future radio communication systems (e.g., 5G, NR, etc. Hereinafter, simply called NR), it is expected to actualize various radio communication services so as to meet respective different requirements (e.g., ultra-high speed, ultra-high capacity, ultra-low delay etc.)

For example, in NR, it is studied to offer radio communication services called eMBB (enhanced Mobile Broad Band, mTMC (massive Machine Type Communication), URLLC (Ultra Reliable and Low Latency Communications) and the like.

In addition, in NR, instead of mapping signals to transmission time intervals (e.g., slots) fixedly, it is studied to map signals flexibly.

In this case, it is considered that mapping of a signal collides with mapping of another signal. By this collision, there is the risk of occurrences of deterioration of communication throughput, deterioration of communication quality and the like.

The present invention was made in view of such a respect, and it is an object of the invention to provide a user terminal and radio communication method for suppressing deterioration of performance due to a collision between signals.

Solution to Problem

A user terminal according to one aspect of the present invention includes a transmitting/receiving section that performs transmission or reception of a data demodulation reference signal and a specified signal different from the data demodulation reference signal, and a control section that controls a change of a first resource and/or a second resource based on notification information from a network, when at least a part of the first resource configured for the data demodulation reference signal overlaps with at least a part of the second resource configured for the specified signal.

Advantageous Effect of the Invention

According to the present invention, it is possible to suppress deterioration of performance due to a collision between signals.

BRIEF DESCRIPTION OF DRAWINGS

FIGS. 3A and 3B are diagrams showing one example of collision avoidance method 1a;

FIGS. 4A and 4B are diagrams showing one example of collision avoidance method 1b;

FIGS. 5A and 5B are diagrams showing one example of collision avoidance method 1c;

DESCRIPTION OF EMBODIMENTS

Figure 1:
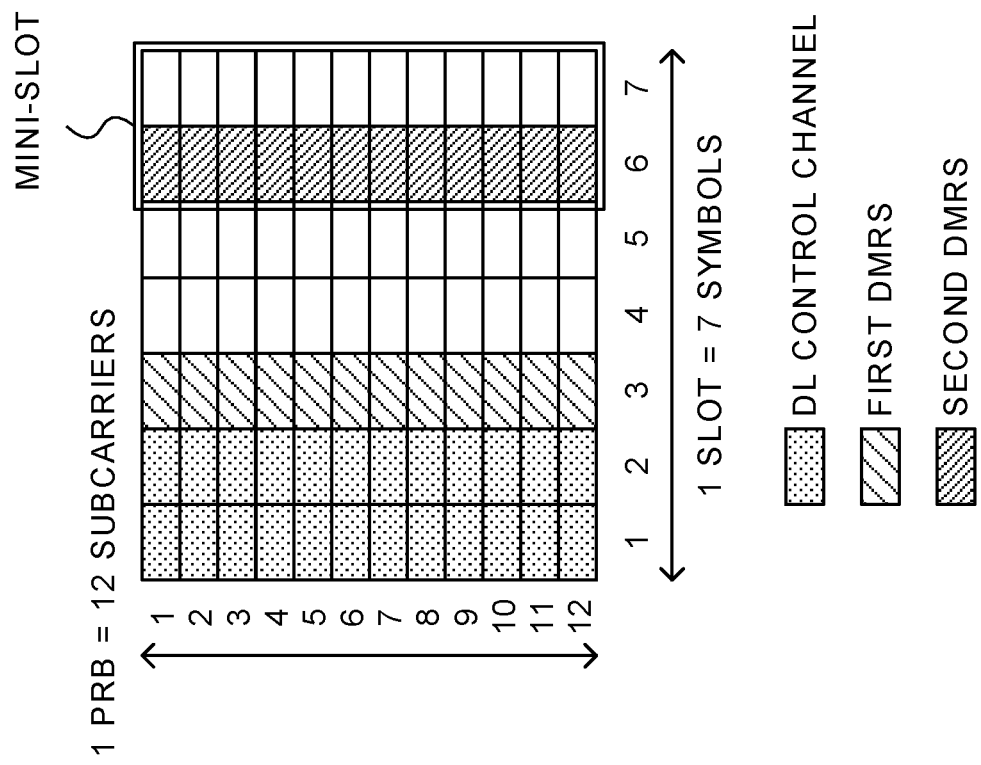
FIG. 1 is a diagram showing one example of mapping of signals by slot-based scheduling and non-slot-based scheduling.

For NR, a plurality of kinds of numerology is capable of being supported in a given carrier. The numerology may be a communication parameter applied to transmission and/or reception of some signal and/or channel, and for example, may indicate at least one of Sub-Carrier Spacing (SCS), bandwidth, symbol length, cyclic prefix length, TTI (Transmission Time Interval) length (e.g., subframe length, slot length), the number of symbols per TTI, radio frame configuration, filtering processing, windowing processing and the like.

Further, in NR, in association with support of a plurality of kinds of numerology, it is studied to introduce the same and/or different time unit (e.g., also referred to as subframe, slot, mini-slot, subslot, TTI, short TTI, radio frame, etc.) as/from in the existing LTE system (e.g., LTE Rel.8-13).

In addition, in the existing LTE system, a radio base station (e.g., also called BS (Base Station), eNB, etc.) transmits downlink control information (DCI) to a user terminal (UE: User Equipment), using a downlink control channel (e.g., PDCCH (Physical Downlink Control Channel), enhanced PDCCH (EPDCCH: Enhanced PDCCH), etc.). The words "transmit (receive) downlink control information" may be read with "transmit (receive) a downlink control channel".

For example, the DCI may be scheduling information including at least one of resources (time and/or frequency resources) of data undergoing scheduling, transport block information, data modulation scheme information, receipt confirmation information (e.g., also referred to as retransmission control information, HARQ-ACK, ACK/NACK, etc.), information on a demodulation reference signal, and the like.

DCI for scheduling DL data reception and/or measurement of a DL reference signal may be called DL assignment (or DL grant). DCI for scheduling UL data transmission and/or transmission of a UL sounding (measurement) signal may be called UL grant.

In NR, slot-based scheduling and non-slot-based scheduling is studied. The slot-based scheduling is to schedule PDSCH (Physical Downlink Shared Channel) or PUSCH (Physical Uplink Shared Channel) using a slot as a basis or reference of data allocation. The non-slot-based scheduling is to schedule data, without using the slot as the unit or reference.

The non-slot-based scheduling may be mini-slot scheduling for scheduling data to mini-slots having a time length shorter than that of the slot, or may schedule data using other time resources such as plurality one or a of symbols as a unit or reference of data allocation.

Irrespective of slot-based scheduling and/or non-slot-based scheduling, to the PDSCH and/or PUSCH is mapped data and DMRS (Demodulation Reference Signal) used for demodulation of the data.

On DL, the UE recognizes a position of DMRS used for data demodulation of PDSCH. In the case of slot-based scheduling, irrespective of a reception start/end symbol position of PDSCH and the number of symbols of PDSCH, a position of a first DMRS used for demodulation of some PDSCH may be fixed to a third or fifth symbol of a slot. Whether to map to the third or fifth may be notified implicitly, based on a bandwidth of the scheduled PDSCH, bandwidth of PDCCH for transmitting DCI and the like, or may be notified explicitly by higher layer signaling such as RRC signaling. In the case of non-slot-based scheduling, irrespective of a start/end position of scheduled PDSCH and the number of symbols of PDSCH, a position of a first DMRS used for demodulation of some PDSCH may be a fixed position (e.g., the first symbol) relative to the start position of the scheduled PDSCH.

On UL, similarly, the UE recognizes a position of DMRS used for data demodulation of PUSCH. On UL, a position of a first DMRS used for data demodulation of some PUSCH may be fixed relative to a start position of scheduled PDSCH, or may be a fixed position relative to a start position of a slot. The fixed position may be changed corresponding to a period of the scheduled PUSCH.

FIG. 1 is a diagram showing one example of mapping of signals in slot-based scheduling and non-slot-based scheduling. A time length of a radio resource in this signal mapping is one slot (7 symbols, symbol #1 to symbol #7), and a transmission bandwidth is one PRB (12 subcarriers, subcarrier #1 to subcarrier #12).

The DL control channel (PDCCH) is mapped to the entire transmission band of symbols #1 and #2.

Further, by slot-based scheduling, first data (not shown) and first DMRS for demodulation of the first data is scheduled. Herein, the first DMRS is mapped to the entire transmission band of symbol #3.

Furthermore, by non-slot-based scheduling, second data (not shown) and second DMRS for demodulation of the second data is scheduled. Herein, a mini-slot is disposed in symbols #6 and #7, the second DMRS for demodulation of the second data is mapped to the entire transmission band of the first symbol (herein, symbol #6) of the mini-slot, and the second data is mapped to the entire transmission band of the second symbol (herein, symbol #7) of the mini-slot. In addition, the mini-slot may be a time unit including given symbols (e.g., symbols #6 and #7) inside a slot, or may be configured to include arbitrary contiguous symbols (e.g., symbol #7 and symbol #1 of the next slot), irrespective of slots.

The first DMRS, first data, second DMRS and second data may be DL, or may be UL.

The DCI in the DL control channel may indicate scheduling of first data and/or second data in the same slot and the same transmission band, or may indicate scheduling of first data and/or second data in another slot and/or another transmission band. Further, the first data and/or the second data may be scheduled by semi-persistent scheduling.

In addition, the DL control channel may be mapped to symbols #1 to #3, and the first DMRS may be mapped to symbol #4. Further, a control resource set may be mapped, and the DL control channel may be mapped to a part of the control resource set.

On DL, a PBCH (Physical Broadcast Channel) is transmitted in some frequency position of some symbol. On UL, a PRACH (Physical Random Access Channel) is transmitted in some frequency position of some symbol. All of UEs may know transmission occasions (time resources) and frequency posit ions (frequency resources) of both channels of the PBCH and PRACH.

On DL, a PSS (Primary Synchronization Signal), SSS (Secondary Synchronization Signal) and/or CSI-RS (Channel State Information-Reference Signal) may be transmitted in some symbol. On UL, an SRS (Sounding Reference Signal) may be transmitted in some symbol.

In addition, each of the channels and/or signals mentioned above may be a channel and/or signal for NR.

The DMRS may be called a data demodulation reference signal or a pilot signal. The CSI-RS and/or SRS may be called a channel information measurement reference signal, channel state measurement reference signal, or propagation path information measurement reference signal. The PSS and SSS may be called synchronization signals.

By thus mapping each channel and/or signal flexibly, it is considered that a collision occurs between the DMRS for the PDSCH or PUSCH, and another channel and/or signal (e.g., at least one of PBCH, PRACH, PSS, SSS, CSI-RS and SRS) on DL or UL. It has not been determined yet how the UE operates in this case.

Therefore, the inventors of the present invention studied methods for suppressing a collision between the DMRS and another channel and/or signal, and arrived at the invention. Embodiments according to the invention will be described below in detail, with reference to drawings. A radio communication method according to each Embodiment may be applied alone, or may be applied in combination.

In addition, as a substitute for a slot, also in the case of using another time unit (e.g., subframe, mini-slot, symbol, transmission time interval (TTI), short TTI, radio frame, etc.), it is possible to similarly apply the present invention.
(Radio Communication Method)

Embodiment 1

In Embodiment 1 of the present invention, with respect to a specified channel (static channel) such as the PBCH and/or PRACH, and another specified signal such as the PSS, SSS, CSI-RS and/or SRS, the UE assumes that any collisions do not occur between these specified channels and/or signals and the DMRS, and performs transmission or reception of the DMRS and specified channel and/or signal. Hereinafter, the specified channel and/or signal may be called a specified signal.

The specified signal may be a channel and/or signal required for the UE to access a network (cell search, random access and the like).

For example, the network (e.g., base station) may determine a position (resources) of the DMRS, based on a position (resources) of the specified signal, on the condition that the specified signal does not collide with the DMRS.

Information on the DMRS and information on the specified signal may be notified (indicated) via dynamic physical layer signaling (e.g., DCI), may be notified (configured) to the UE via semi-static and/or static higher layer signaling (e.g., RRC (Radio Resource Control) signaling, broadcast information (Master Information Block), System Information Block (SIB), etc.), and MAC (Medium Access Control) signaling), or may be notified to the UE using another signal or combination thereof.

Figure 2:
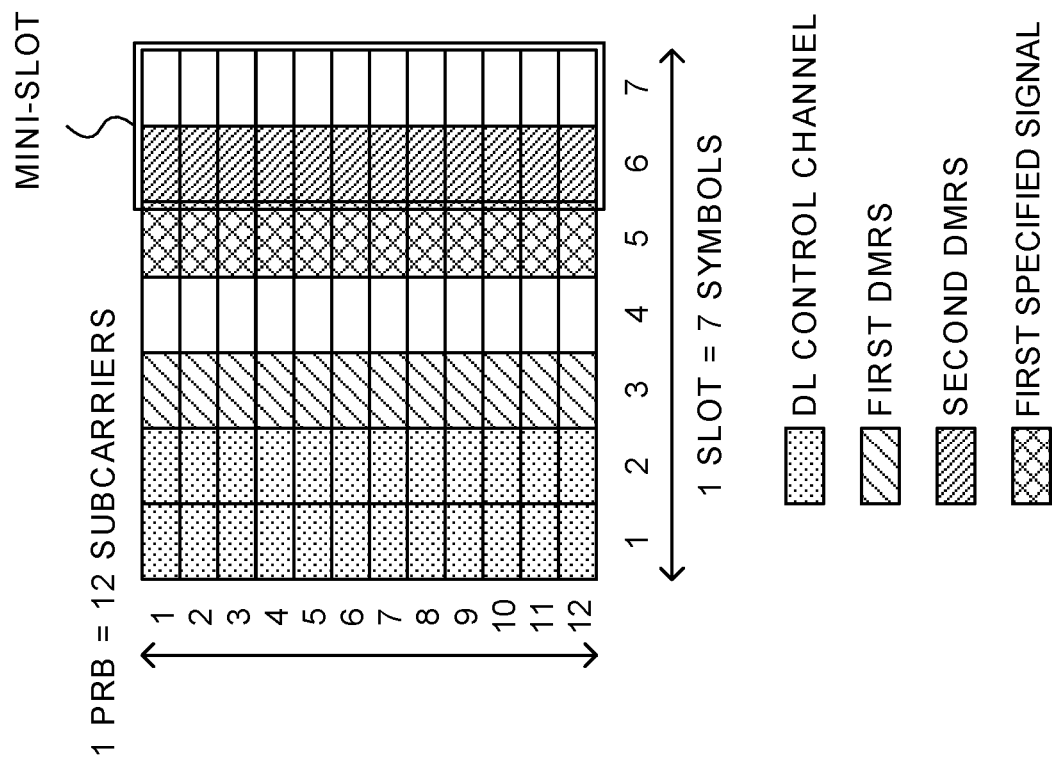
FIG. 2 is a diagram showing one example of mapping where a second DMRS does not collide with a first specified signal.

In an example of FIG. 2, as in FIG. 1, the network maps the DL control channel to radio resources of 1 PRB and 1 slot. Further, the network maps a first specified signal (e.g., CSI-RS, SRS) to symbol #5. Furthermore, the network schedules first data and first DMRS by slot-based scheduling. Herein, the network maps the first DMRS to the enter transmission band of symbol #3.

Further, the network schedules a second DMRS and second data by non-slot-based scheduling. Herein, the network determines time resources and/or frequency resources of the second DMRS so as to meet the condition that the second DMRS does not collide with the first specified signal. In other words, the network determines scheduling of the data so that a resource (symbol #6) different from a resource (symbol #5) of the first specified signal is a resource of the second DMRS. By this operation, it is possible to prevent the second DMRS from colliding with the first specified signal.

In addition, the network may determine the resource different from the resource of the second DMRS as a resource of the first specified signal. The network may determine the resource different from the resource of the first specified signal as the resource of the first DMRS.

In the case where the DL data (PDSCH) is scheduled, on the assumption that the known first specified signal and DMRS used for demodulation of the data are not mapped to the same resource, the UE recognizes the resource of the DMRS, and performs reception of the data, and channel estimation based on the DMRS. In the case where the UL data (PUSCH) is scheduled, on the assumption that the known first specified signal and DMRS used for demodulation of the data are not mapped to the same resource, the UE recognizes the resource of the DMRS, and performs transmission of the data and transmission of the DMRS.

According to Embodiment 1 as described above, the network limits mapping of signals, and it is thereby possible to suppress occurrences of the collision between the DMRS and the specified signal. Further, it is possible to suppress an information amount of signaling for suppression of the collision. Furthermore, the UE performs the processing, while assuming that the collision does not occur, and it is thereby possible to suppress the processing load.

Embodiment 2

In Embodiment 2 of the present invention, in the case where a collision between the DMRS and the specified signal occurs, the network and UE avoid the collision, by changing a resource of the DMRS and/or specified signal.

Collision avoidance methods 1 and 2 that are examples of the collision avoidance method will be described below.
«Collision Avoidance Method 1»

In collision avoidance method 1, one of two signals colliding with each other is shifted in the frequency domain and/or time domain.

On DL, for example, the DMRS or specified signal (e.g., CSI-RS) may be shifted to another subcarrier (collision avoidance method 1a). This shift may be performed by increasing the subcarrier index of the targeted signal, or by decreasing the subcarrier index of the targeted signal.

On DL, for example, the DMRS or specified signal (e.g., CSI-RS) may be shifted to another OFDM symbol (collision avoidance method 1b). This shift may be performed by increasing the symbol index of the targeted signal, or by decreasing the symbol index of the targeted signal.

On DL, for example, the DMRS or specified signal (e.g., CSI-RS) may be shifted to another subcarrier and another OFDM symbol (collision avoidance method 1c).

On UL, for example, the DMRS or specified signal (e.g., SRS) may be shifted to another subcarrier. This shift may be performed by increasing the subcarrier index of the targeted signal, or by decreasing the subcarrier index of the targeted signal. On UL, for example, the DMRS or specified signal (e.g., SRS) may be shifted to another OFDM symbol. This shift may be performed by increasing the symbol index of the targeted signal, or by decreasing the symbol index of the targeted signal.

The collision avoidance methods 1a, 1b and 1c that are specific examples of the collision avoidance method 1 will be described below.

FIG. 3 shows one example of the collision avoidance method 1a of shifting DMRSs inside a mini-slot in the time domain.

Figure 3B:
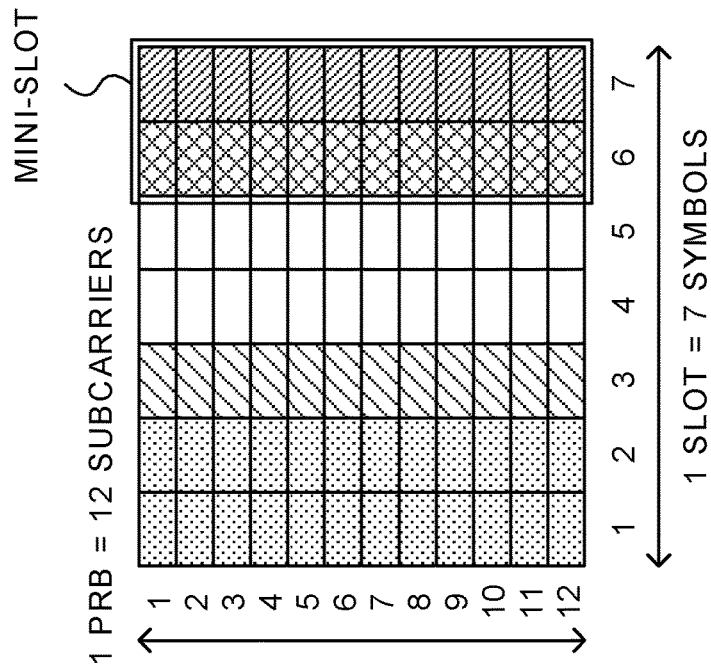
Figure 3A:
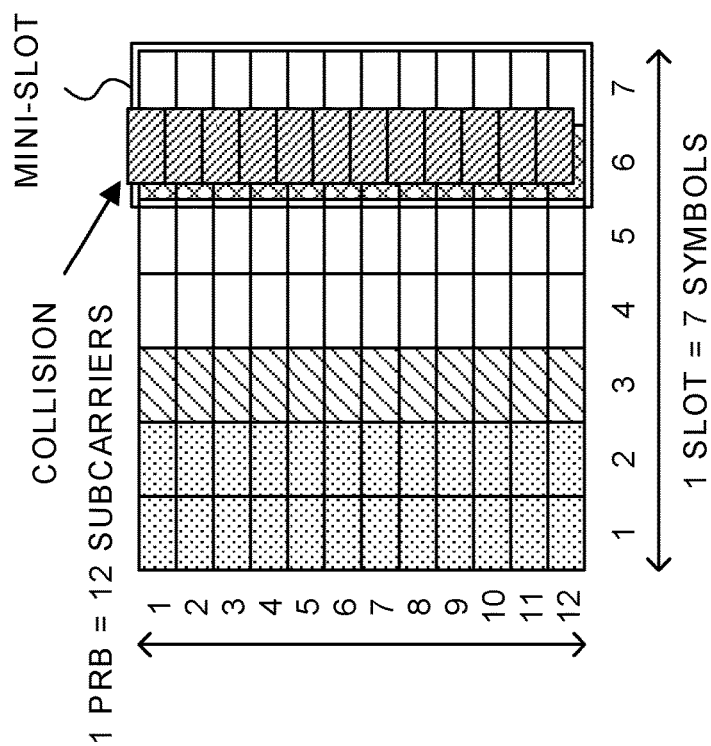

In the example of FIG. 3A, as in FIG. 1, the DL control channel and first DMRS are mapped. Further, the first specified signal (CSIR-RS or SRS) is mapped to the entire transmission band of symbol #6.

Further, the second data and second DMRS is scheduled by non-slot-based scheduling. Herein, a mini-slot is disposed in symbols #6 and #7, the second DMRS is mapped to the entire transmission band of the first symbol (symbol #6) of the mini-slot, and the second data is mapped to the entire transmission band of symbol #7. By this mapping, a collision between the second DMRS and the first specified signal occurs in symbol #6.

In this case, as shown in FIG. 3B, in the collision avoidance method 1a, by shifting the second DMRS of symbol #6 in the positive direction in the time domain by one symbol, the second DMRS is re-mapped to symbol #7. Further, in the collision avoidance method 1a, by shifting the second data of symbol #7 in the negative direction in the time domain by one symbol, the second data is re-mapped to symbol #6. In other words, the collision avoidance method 1a is to replace the position of the second DMRS and the position of the second data inside the mini-slot with each other.

According to the collision avoidance method 1a as described above, in the case where there is no vacancy in the same symbol such that the second DMRS is mapped to the entire transmission band, by shifting the second DMRS in the time domain, it is possible to avoid the collision between the second DMRS and the first specified signal.

FIG. 4 shows one example of the collision avoidance method 1b of shifting DMRSs inside a mini-slot in the frequency domain.

In the example of FIG. 4A, as in FIG. 1, the DL control channel and first DMRS are mapped. Further, the first specified signal (CSI-RS or SRS) is mapped to subcarriers #1, #2, #5, #6, #9 and #10 of symbol #6.

Further, the second data and second DMRS is scheduled by non-slot-based scheduling. Herein, a mini-slot is disposed in symbols #6 and #7, non-contiguous second DMRSs are mapped to subcarriers #1, #2, #5, #6, #9 and #10 of the first symbol (symbol #6) of the mini-slot, and the second data is mapped to subcarriers #1, #2, #5, #6, #9 and #10 of the second symbol (symbol #7) of the mini-slot. By this mapping, a collision between the second DMRS and the first specified signal occurs in symbol #6.

In this case, as shown in FIG. 4A, in the collision avoidance method 1b, by shifting the second DMRS in the positive direction in the frequency domain by two subcarriers, the second DMRS is re-mapped to subcarriers #3, #4, #7, #8, #11 and #12.

According to the collision avoidance method 1b as described above, in the case where a vacancy exists in the same symbol such that the second DMRS is mapped discontinuously in the frequency domain, by shifting the second DMRS in the frequency domain, it is possible to avoid the collision between the second DMRS and the first specified signal.

FIG. 5 shows one example of the collision avoidance method 1c of shifting DMRSs in the time domain and frequency domain.

In the example of FIG. 5A, as in FIG. 1, the DL control channel and first DMRS are mapped. Further, a first specified signal (specified signal, e.g., CSI-RS or SRS) is mapped to the entire transmission band of symbol #6, and a second specified signal (e.g., CSI-RS or SRS) is mapped to subcarriers #1, #2, #5, #6, #9 and #10 of symbol #7.

Further, the second data and second DMRS is scheduled by non-slot-based scheduling. Herein, a mini-slot is disposed in symbols #6 and #7, non-contiguous second DMRSs are mapped to subcarriers #1, #2, #5, #6, #9 and #10 of the first symbol (symbol #6) of the mini-slot, and the second data is mapped to subcarriers #1, #2, #5, #6, #9 and #10 of the second symbol (symbol #7) of the mini-slot. By this mapping, a collision between the second DMRS and the first specified signal occurs in symbol #6.

In this case, in the collision avoidance method 1c, by shifting the second DMRS of symbol #6 in the positive direction in the time domain by one symbol, the second DMRS is re-mapped to symbol #7.

Further, in the collision avoidance method 1c, by shifting the second data of symbol #7 in the negative direction in the time domain by one symbol, the second data is re-mapped to symbol #6. In other words, the collision avoidance method 1c is to replace the position of the second DMRS and the position of the second data inside the mini-slot with each other.

In this state, it is possible to avoid the collision between the second DMRS and the first specified signal, but a collision between the second DMRS and the second specified signal occurs.

Therefore, as shown in FIG. 5B, further, in the collision avoidance method 1c, by shifting the second DMRS of symbol #6 in the positive direction in the frequency domain by two subcarriers, the second DMRS is re-mapped to subcarriers #3, #4, #7, #8, #11 and #12.

Furthermore, in the collision avoidance method 1c, by shifting the second data of symbol #7 in the positive direction in the frequency domain by two subcarriers, the second data is re-mapped to subcarriers #3, #4, #7, #8, #11 and #12. In other words, the collision avoidance method 1c is to perform the same frequency shift on the second DMRS and second data inside the mini-slot.

According to the collision avoidance method 1c as described above, in the case where there is no vacancy in the same symbol such that the second DMRS is mapped to the entire transmission band and in the case where a vacancy exists in the symbol of the second specified signal such that the second specified signal of another symbol is mapped discontinuously in the frequency domain, by shifting the second DMRS in the time domain and frequency domain, it is possible to avoid the collision between the second DMRS, and the first specified signal and second specified signal.

In addition, in the collision avoidance method 1, both of the DMRS and the specified signal may be shifted in the time domain and/or the frequency domain. For example, a part or the whole of DMRSs may be shifted, and apart or the whole of specified signals may be shifted to avoid the collision between the DMRS and the specified signal.

According to the collision avoidance method 1 as described above, by shifting the second DMRS in the time domain and/or the frequency domain, it is possible to avoid the collision between the second DMRS and the specified signal.

«Collision Avoidance Method 2»

In collision avoidance method 2, the DMRS undergoes rate matching around the specified signal (e.g., CSI-RS, SRS).

A sequence of the DMRS is determined, by a rate matching pattern of the DMRS on a symbol. For example, as a result of rate matching, in the case where the DMRS has X REs (Resource Elements), DMRS sequences of X samples are generated using sequences having a sequence length of X samples or less. The sequence may be a CAZAC sequence (e.g., Zadoff-Chu sequence), or may be a sequence (computer-generated sequence) obtained by calculation. This sequence may be beforehand determined by specifications. For example, it is possible to obtain DMRS sequences of X samples, by performing cyclic extension on a Zadoff-Chu sequence with the maximum prime number of X or less as a sequence length.

FIG. 6 shows one example of the collision avoidance method 2.

Figure 6B:
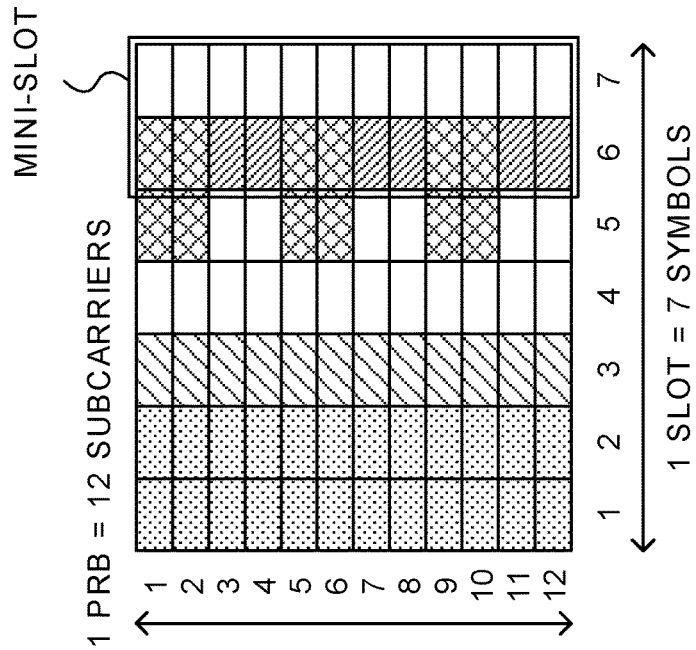
FIGS. 6A and 6B are diagrams showing one example of collision avoidance method 2.
Figure 6A:
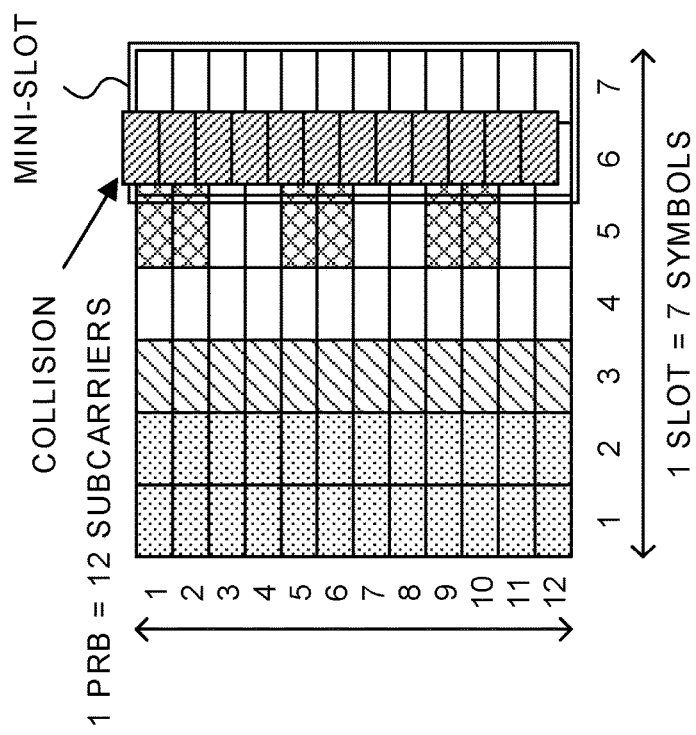

In the example of FIG. 6A, as in FIG. 1, the DL control channel and first DMRS are mapped. Further, the first specified signal (CSI-RS or SRS) is mapped to subcarriers #1, #2, #5, #6, #9 and #10 of symbols #5 and #6.

Further, the second data and second DMRS is scheduled by non-slot-based scheduling. Herein, a mini-slot is disposed in symbols #6 and #7, the second DMRS is mapped to the entire transmission band of the first symbol (symbol #6) of the mini-slot, and the second data is mapped to the entire transmission band of the second symbol (symbol #7) of the mini-slot. By this mapping, a collision between the second DMRS and the first specified signal occurs in subcarriers #1, #2, #5, #6, #9 and #10 of symbol #6.

In this case, as shown in FIG. 6B, in the collision avoidance method 2, the second DMRS inside the mini-slot is subjected to rate matching around the first specified signal. In other words, a sequence length of the second DMRS is decreased to generate a new second DMRS, and the new second DMRS is re-mapped to resources except resources where the second DMRS overlaps with the first specified signal.

In the example in the figure, by rate matching, resources of the second DMRS are decreased from 12 REs to 6 REs. Accordingly, in contrast to that the second DMRS prior to rate matching is generated using a sequence with a sequence length of 12 or less, the second DMRS subsequent to rate matching is generated using a sequence with a sequence length of 6 or less.

Further, in the case where the second DMRS is subjected to rate matching, the second data may be also subjected to rate matching. For example, frequency resources of the second data subsequent to rate matching may be the same frequency resources as those of the second DMRS subsequent to rate matching.

In addition, in the collision avoidance method 2, rate matching may be performed on both of the second DMRS and the first specified signal. For example, rate matching of the second DMRS may be performed in some part of the overlapping part, and rate matching of the first specified signal may be performed in another part of the overlapping part.

In addition, DMRS sequences of X samples may be obtained by another method, e.g. by using continuous X samples among DMRS sequences prior to rate matching as a DMRS sequence subsequent to rate matching, using continuous X samples among sequences longer than X samples as a DMRS sequence subsequent to rate matching, and the like.

According to the collision avoidance method 2 as described above, it is possible to prevent the collision between the second DMRS and the first specified signal from occurring. Further, since there is no need of allocating new resources to the second DMRS, it is possible to suppress increases in processing in the network and UE and signaling.

In addition, the network and UE may combine the collision avoidance methods 1 and 2. For example, after shifting time resources of the second DMRS, rate matching of the second DMRS may be performed.

Further, in the case where the first DMRS collides with the first specified signal and/or the second specified signal, in the collision avoidance methods 1 and 2, resources of the first DMRS may be changed.

According to Embodiment 2 as described above, also in the case where first resources configured for the DMRS overlap with second resources configured for the specified signal, by changing the first resources and/or the second resources, it is possible to avoid the collision.

Embodiment 3

In Embodiment 3 of the present invention, the UE performs collision avoidance based on signaling from the network. Described below are signaling methods 1 and 2 that are examples of the signaling method.

«Signaling Method 1»

In the signaling method 1, the network notifies the UE of collision avoidance implicitly.

In the case where a collision between the DMRS and the specified signal (e.g., CSI-RS or SRS) occurs, based on higher layer signaling for configuring the specified signal, the UE automatically performs the collision avoidance method 1 and/or collision avoidance method 2 previously described. In the case where the DMRS collides with the specified signal, the network may perform the same collision avoidance method 1 and/or collision avoidance method 2 as in the UE.

For example, in a state in which the specified signal of at least one of PBCH, PSS, SSS, PRACH and SRS is configured by higher layer signaling, in the case where data transmission is scheduled, the UE determines a DMRS position that does not collide with the specified signal. Herein, the DMRS position is determined by the UE, based on information notified implicitly from the network, or information notified explicitly from the network.

For example, in the case where DL data (PDSCH) is scheduled, the UE recognizes resources of a DMRS used for demodulation of the data. In the case where the specified signal collides with the DMRS, the UE performs collision avoidance for changing resources of the DMRS based on resources of the specified signal, and using the resources obtained by the collision avoidance, performs reception of the data, and channel estimation based on the DMRS. In the case where UL data (PUSCH) is scheduled, the UE recognizes resources of a DMRS used for demodulation of the data. In the case where the specified signal collides with the DMRS, the UE performs collision avoidance for changing resources of the DMRS based on resources of the specified signal, and using the resources obtained by the collision avoidance, performs transmission of the data, and transmission of the DMRS.

According to the signaling method 1 as described above, since there is no need of explicit signaling for collision avoidance, it is possible to suppress an information amount of signaling.

«Signaling Method 2»

In the signaling method 2, the network notifies the UE of collision avoidance explicitly.

For example, in the case where the DMRS collides with the specified signal, the network performs collision avoidance using the collision avoidance method 1 and/or collision avoidance method 2, and transmits DCI including instructions for the collision avoidance to the UE. The UE performs collision avoidance based on the instructions included in the DCI.

For example, in the case where DL data (PDSCH) is scheduled, the UE recognizes resources of a DMRS used for demodulation of the data. In this state, in the case of receiving DCI including instructions for collision avoidance, the UE performs collision avoidance for changing resources of the specified signal and the DMRS based on the instruction, and using resources obtained by the collision avoidance, performs reception of the data, and channel estimation based on the DMRS. In the case where UL data (PUSCH) is scheduled, the UE recognizes resources of a DMRS used for demodulation of the data. In this state, in the case of receiving DCI including instructions for collision avoidance, the UE performs collision avoidance for changing resources of the specified signal and the DMRS based on the instructions, and using resources obtained by the collision avoidance, performs transmission of the data, and transmission of the DMRS.

For example, DCI giving instructions for the collision avoidance method 1 may indicate a shift amount and/or shift direction in the time domain and/or the frequency domain, or may indicate time resources and/or frequency resources subsequent to the shift. For example, DCI giving instructions for the collision avoidance method 2 may indicate resources subsequent to rate matching, a sequence subsequent to rate matching, or resources eliminated by rate matching.

According to the signaling method 2 as described above, the network is able to dynamically perform collision avoidance corresponding to the occurrence of the collision, and instruct the UE to perform collision avoidance. Further, the UE performs collision avoidance according to DCI, and does not need to determine the collision avoidance method, and it is thereby possible to suppress the processing load.

According to Embodiment 3 as described above, the network performs collision avoidance, while the UE performs collision avoidance based on signaling, and the UE is thereby capable of matching a change in resources by the UE with a change in resources by the network.

(Radio Communication System)

A configuration of a radio communication system according to one Embodiment of the present invention will be described below. In the radio communication system, communication is performed using any of the radio communication method according to each above-mentioned Embodiment of the invention or combination thereof.

Figure 7:
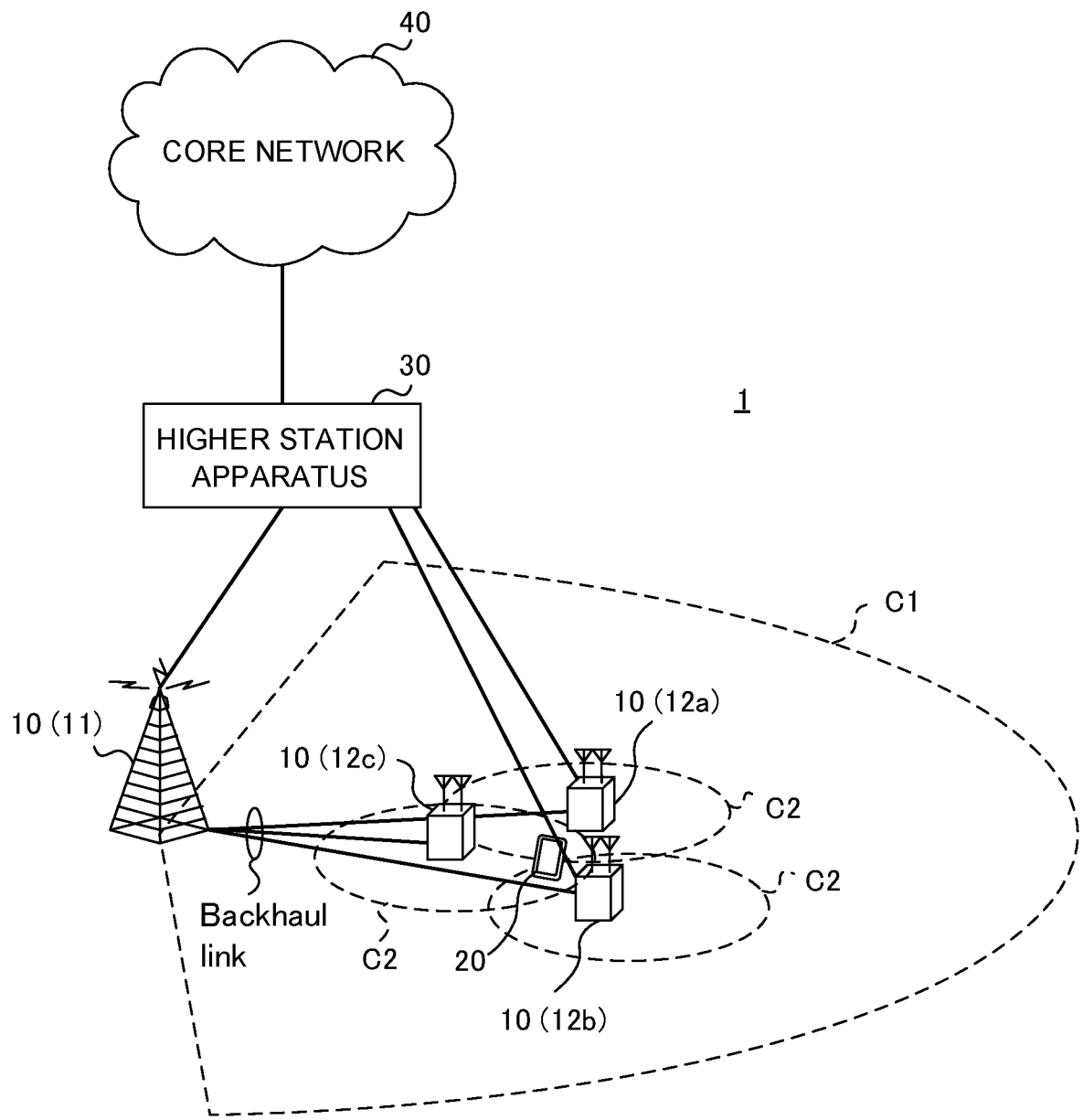
FIG. 7 is a diagram showing one example of a schematic configuration of a radio communication system according to one Embodiment of the present invention.

FIG. 7 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology) and the like, or may be called the system to actualize the aforementioned system.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2. The arrangement of each cell and user terminal 20, the numbers thereof and the like are not limited to those shown in the figure.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g., 5 CCs or less, 6 CCs or more).

The user terminal 20 and radio base station 11 are capable of communicating with each other using carriers (called the existing carrier, legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface and the like), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier Frequency Division Multiple Access (SC-FDMA) and/or OFDMA is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes PDCCH (Physical Downlink Control Channel), EPDCCH (Enhanced Physical Downlink Control channel), PCFICH (Physical Control Format Indicator Channel), PHICH (Physical Hybrid-ARQ Indicator Channel) and the like. The downlink control information (DCI) including scheduling information of the PDSCH and/or PUSCH and the like is transmitted on the PDCCH.

In addition, the scheduling information may be notified by DCI. For example, DCI for scheduling DL data reception may be called DL assignment, and DCI for scheduling UL data transmission may be called UL grant.

The number of OFDM symbols used in the PDCCH is transmitted on the PCFICH. Receipt confirmation information (e.g., also referred to as retransmission control information, HARQ-ACK, ACK/NACK, and the like) of HARQ (Hybrid Automatic Repeat reQuest) for the PUSCH is transmitted on the PHICH. The EPDCCH is frequency division multiplexed with the PDSCH (downlink shared data channel) to be used for transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data, higher layer control information and the like is transmitted on the PUSCH. Further, radio quality information (CQI: Channel Quality Indicator) of downlink, receipt confirmation information, Scheduling Request (SR) and the like are transmitted on the PUCCH. A random access preamble to establish connection with the cell is transmitted on the PRACH.

As downlink reference signals, in the radio communication system 1 are transmitted Cell-specific Reference Signal (CRS), Channel State Information-Reference Signal (CSI-RS), DeModulation Reference Signal (DMRS), Positioning Reference Signal (PRS) and the like. Further, as uplink reference signals, in the radio communication system 1 are transmitted Sounding Reference Signal (SRS), DeModulation Reference Signal (DMRS) and the like. In addition, the DMRS may be called UE-specific Reference Signal. Further, the transmitted reference signals are not limited thereto.

(Radio Base Station)

Figure 8:
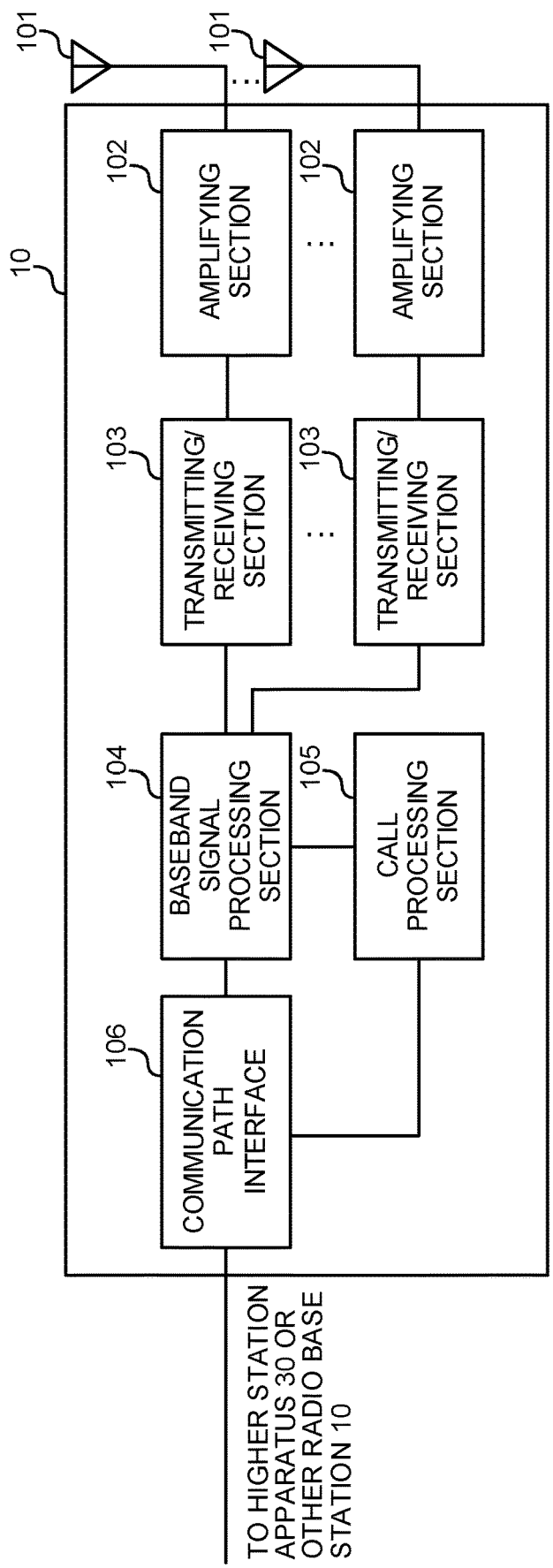
FIG. 8 is a diagram showing one example of an entire configuration of a radio base station according to one Embodiment of the invention.

FIG. 8 is a diagram showing one example of an entire configuration of the radio base station according to one Embodiment of the present invention. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ), scheduling, transmission format selection, channel coding, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101. The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for uplink signals, radio-frequency signals received in the transmitting/receiving antennas 101 are amplified in the amplifying sections 102. The transmitting/receiving section 103 receives the uplink signal amplified in the amplifying section 102. The transmitting/receiving section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing (setting, releasing, etc.) of a communication channel, state management of the radio base station 10, and management of radio resources.

The communication path interface 106 transmits and receives signals to/from the higher station apparatus 30 via a given interface. Further, the communication path interface 106 may transmit and receive signals (backhaul signaling) to/from another radio base station 10 via an inter-base station interface (e.g., optical fiber in conformity with CPRI (Common Public Radio Interface), X2 interface).

Further, the transmitting/receiving section 103 may perform transmission or reception of a data demodulation reference signal and a specified signal different from the data demodulation reference signal.

Figure 9:
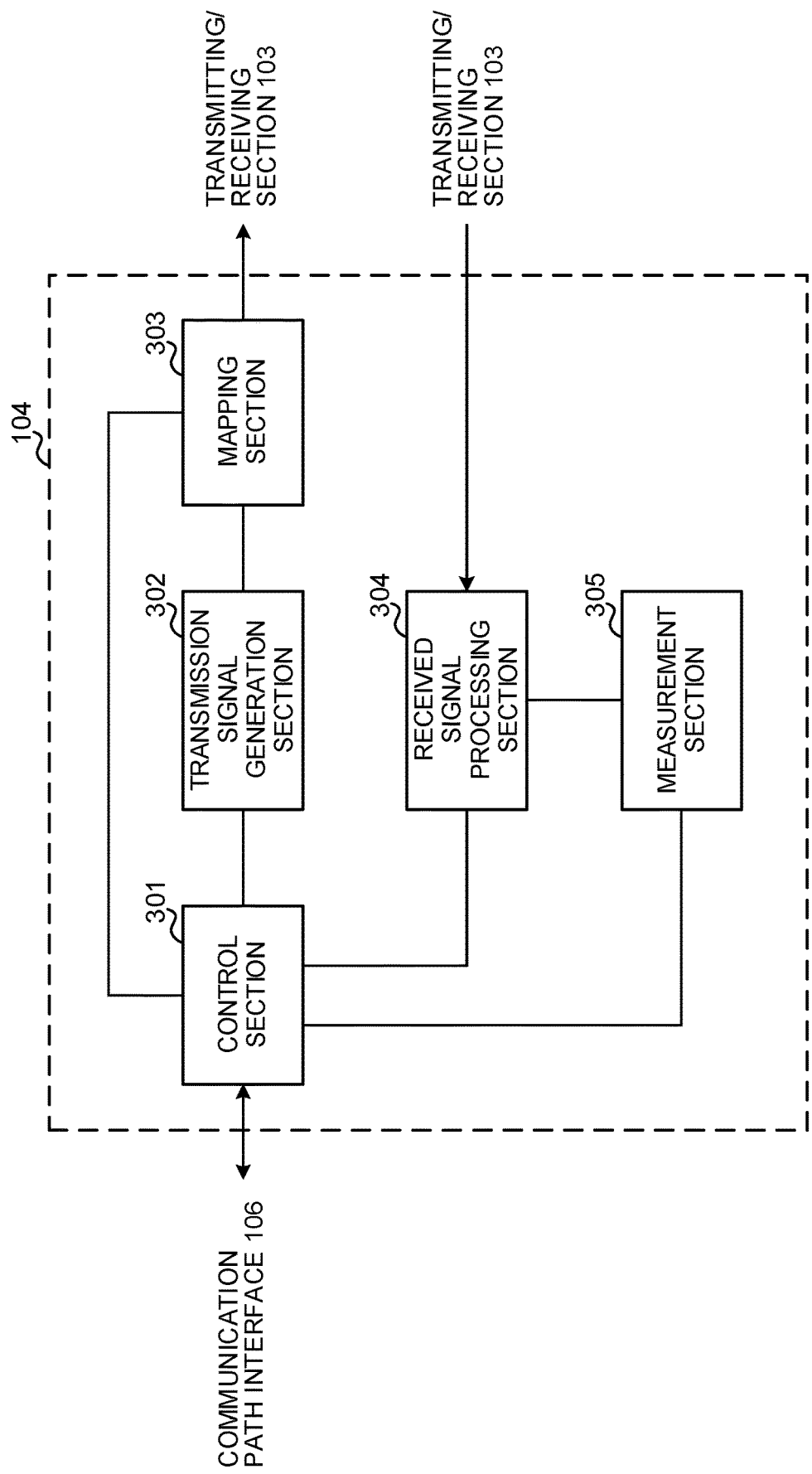
FIG. 9 is a diagram showing one example of a function configuration of the radio base station according to one Embodiment of the invention.

FIG. 9 is a diagram showing one example of a function configuration of the radio base station according to one Embodiment of the present invention. In addition, this example mainly illustrates function blocks of a characteristic portion in this Embodiment, and the radio base station 10 is assumed to have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and apart or the whole of the components may not be included in the baseband signal processing section 104.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals by the transmission signal generating section 302, allocation of signals by the mapping section 303 and the like. Further, the control section 301 controls reception processing of signals by the received signal processing section 304, measurement of signals by the measurement section 305 and the like.

The control section 310 controls scheduling (e.g., resource allocation) of system information, downlink data signal (e.g., signal transmitted on the PDSCH), and downlink control signal (e.g., signal transmitted on the PDCCH and/or EPDCCH. Receipt confirmation information, etc.). Further, based on a result obtained by determining the necessity of retransmission control to the uplink data signal, and the like, the control section 301 controls generation of the downlink control signal, downlink data signal and the like. Furthermore, the control section 301 controls scheduling of the synchronization signal (e.g., PSS (Primary Synchronization Signal)/SSS (Secondary Synchronization Signal)), downlink reference signal (e.g., CRS, CSI-RS, DMRS) and the like.

Further, the control section 301 controls scheduling of the uplink data signal (e.g., signal transmitted on the PUSCH), uplink control signal (e.g., signal transmitted on the PUCCH and/or PUSCH. Receipt confirmation information, etc.), random access preamble (e.g., signal transmitted on the PRACH), uplink reference signal and the like.

Furthermore, the control section 301 may control a change of first resources and/or second resources (e.g., the collision avoidance methods 1, 2), in the case where at least a part of the first resources configured for the data demodulation reference signal (e.g., DMRS) overlaps with at least a part of the second resources configured for the specified signal (e.g., at least one of PBCH, PRACH, PSS, SSS, CSI-RS and SRS).

Still furthermore, in the case where at least a part of the first resources overlaps with at least a part of the second resources, the control section 301 may shift the first resources and/or the second resources in the time domain and/or the frequency domain.

Moreover, in the case where a part of the first resources overlaps with at least a part of the second resources, the control section 301 may map a data demodulation reference signal having a sequence length shorter than a sequence length of a data demodulation reference signal to resources obtained by removing the part overlapping with the second resources from the first resources.

Further, the control section 301 may control transmission of higher layer signaling indicating a configuration of the specified signal.

Furthermore, the control section 301 may control transmission of DL control information for giving instructions for the change.

Based on instructions from the control section 301, the transmission signal generating section 302 generates downlink signals (downlink control signal, downlink data signal, downlink reference signal, etc.) to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates DL assignment for notifying of allocation information of downlink data and/or UL grant for notifying of allocation information of uplink data. Each of the DL assignment and UL grant is DCI, and complies with the DCI format. Further, the downlink data signal is subjected to coding processing and modulation processing, according to a coding rate, modulation scheme and the like determined based on the channel state information (CSI) and the like from each user terminal 20.

Based on instructions from the control section 301, the mapping section 303 maps the downlink signal generated in the transmission signal generating section 302 to given radio resources to output to the transmitting/receiving section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding, etc.) on the received signal input from the transmitting/receiving section 103. Herein, for example, the received signal is the uplink signal (uplink control signal, uplink data signal, uplink reference signal, etc.) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving the PUCCH including HARQ-ACK, the section 304 outputs HARQ-ACK to the control section 301. Further, the received signal processing section 304 outputs the received signal and/or signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, based on the received signal, the measurement section 305 may perform RRM (Radio Resource Measurement) measurement, CSI (Channel State Information) measurement and the like. The measurement section 305 may measure received power (e.g., RSRP (Reference Signal Received Power)), received quality (e.g., RSRQ (Reference Signal Received Quality), SINR (Signal to Interference plus Noise Ratio)), signal strength (e.g., RSSI (Received Signal Strength Indicator)), propagation path information (e.g., CSI), and the like. The measurement result may be output to the control section 301.

(User Terminal)

Figure 10:
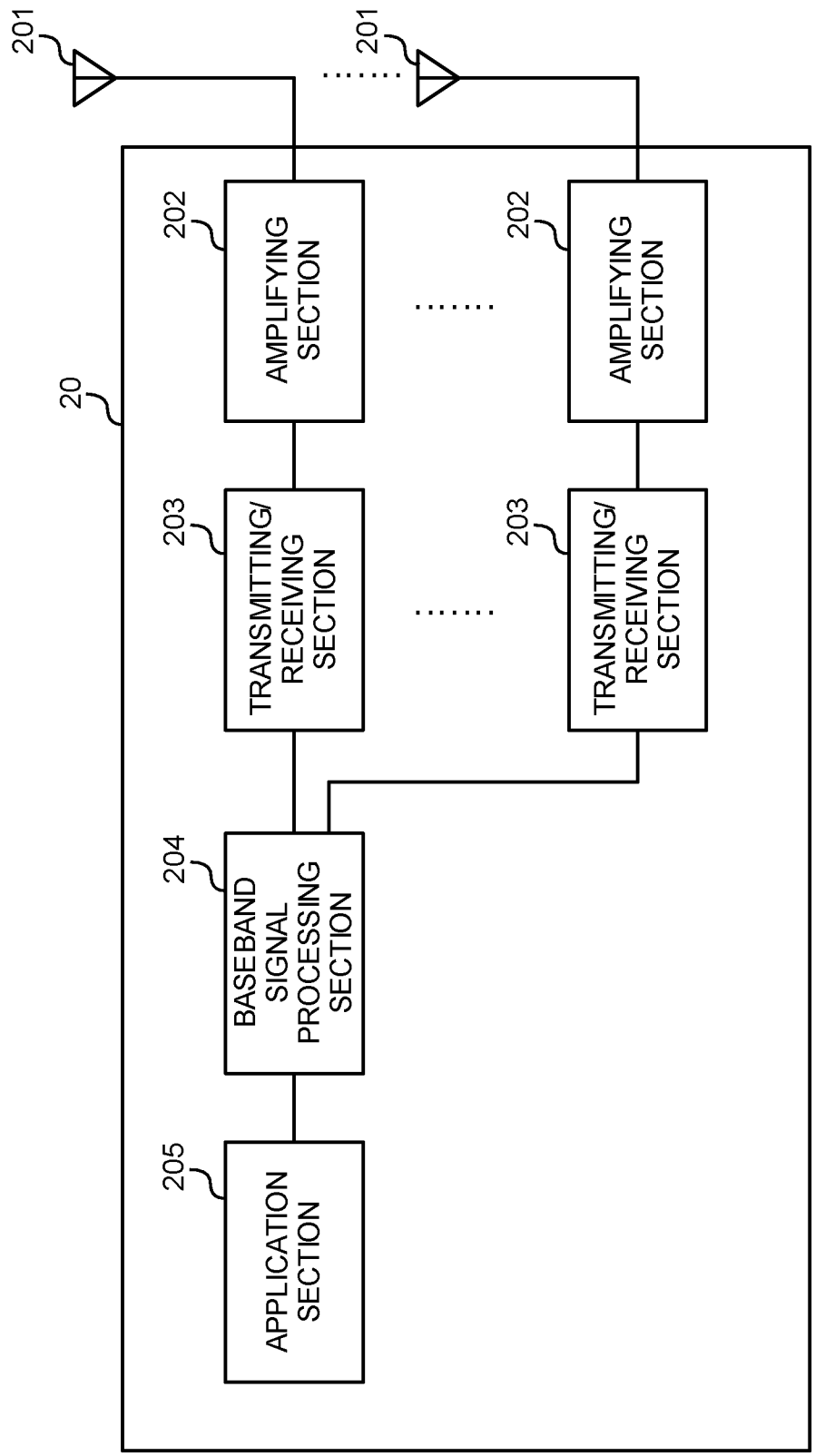
FIG. 10 is a diagram showing one example of an entire configuration of a user terminal according to one Embodiment of the invention.

FIG. 10 is a diagram showing one example of an entire configuration of the user terminal according to one Embodiment of the present invention. The user terminal 20 is provided with a plurality of transmitting/receiving antennas 201, amplifying sections 202, transmitting/receiving sections 203, baseband signal processing section 204, and application section 205. In addition, with respect to each of the transmitting/receiving antenna 201, amplifying section 202, and transmitting/receiving section 203, the user terminal may be configured to include at least one or more.

Radio-frequency signals received in the transmitting/receiving antennas 201 are respectively amplified in the amplifying sections 202. Each of the transmitting/receiving sections 203 receives the downlink signal amplified in the amplifying section 202. The transmitting/receiving section 203 performs frequency conversion on the received signal into a baseband signal to output to the baseband signal processing section 204. The transmitting/receiving section 203 is capable of being comprised of a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information may be also transferred to the application section 205.

On the other hand, for user data on uplink, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmitting/receiving sections 203. Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

Further, the transmitting/receiving section 203 may perform transmission or reception of a data demodulation reference signal and a specified signal different from the data demodulation reference signal.

Figure 11:
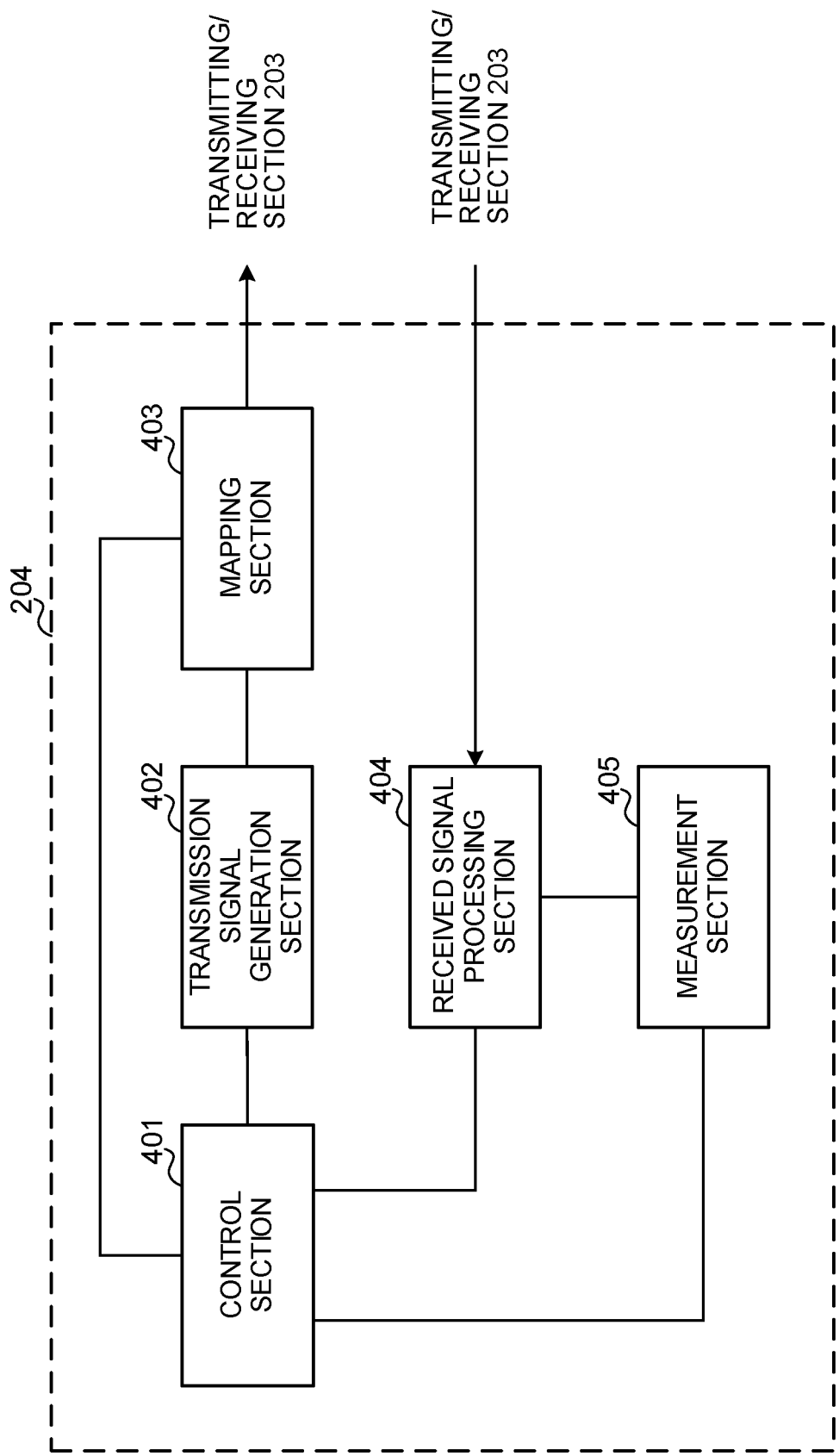
FIG. 11 is a diagram showing one example of a function configuration of the user terminal according to one Embodiment of the invention.

FIG. 11 is a diagram showing one example of a function configuration of the user terminal according to one Embodiment of the present invention. In addition, this example mainly illustrates function blocks of a characteristic portion in this Embodiment, and the user terminal 20 is assumed to have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402, allocation of signals by the mapping section 403 and the like. Further, the control section 401 controls reception processing of signals by the received signal processing section 404, measurement of signals by the measurement section 405 and the like.

The control section 401 acquires the downlink control signal and downlink data signal transmitted from the radio base station 10, from the received signal processing section 404. Based on the downlink control signal and/or a result obtained by determining the necessity of retransmission control to the downlink data signal, and the like, the control section 401 controls generation of an uplink control signal and/or uplink data signal.

Further, the control section 401 may control a change of first resources and/or second resources (e.g., the collision avoidance methods 1, 2) based on notification information (e.g., higher layer signaling or DCI) from the network, in the case where at least a part of the first resources (e.g., time resources and/or frequency resources) configured for the data demodulation reference signal (e.g., DMRS) overlaps with at least a part of the second resources (e.g., time resources and/or frequency resources) configured for the specified signal (e.g., at least one of PBCH, PRACH, PSS, SSS, CSI-RS and SRS).

Furthermore, in the case where at least a part of the first resources overlaps with at least a part of the second resources, the control section 401 may shift the first resources and/or the second resources in the time domain and/or the frequency domain.

Still furthermore, in the case where a part of the first resources overlaps with at least apart of the second resources, the control section 401 may map a data demodulation reference signal having a sequence length shorter than a sequence length of a data demodulation reference signal to resources obtained by removing the part overlapping with the second resources from the first resources.

Further, the notification information is higher layer signaling indicating a configuration of the specified signal, and based on the notification information, the control section 401 may determine first resources subsequent to the change.

Furthermore, the notification information is DL control information giving instructions for the change, and based on the notification information, the control section 401 may determine first resources subsequent to the change.

Based on instructions from the control section 401, the transmission signal generating section 402 generates uplink signals (uplink control signal, uplink data signal, uplink reference signal, etc.) to output to the mapping section 403. The transmission signal generating section 402 is capable of being comprised of a signal generator, signal generating circuit or signal generating apparatus explained based on the common recognition in the technical field according to the present invention.

For example, based on instructions from the control section 401, the transmission signal generating section 402 generates the uplink control signal concerning receipt confirmation information, channel state information (CSI) and the like. Further, based on instructions from the control section 401, the transmission signal generating section 402 generates the uplink data signal. For example, when the downlink control signal notified from the radio base station 10 includes the UL grant, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmitting/receiving section 203. The mapping section 403 is capable of being comprised of a mapper, mapping circuit or mapping apparatus explained based on the common recognition in the technical field according to the present invention.

The received signal processing section 404 performs reception processing (e.g., demapping, demodulation, decoding, etc.) on the received signal input from the transmitting/receiving section 203. Herein, for example, the received signal is the downlink signal (downlink control signal, downlink data signal, downlink reference signal, etc.) transmitted from the radio base station 10. The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

The received signal processing section 404 outputs the information decoded by the reception processing to the control section 401. For example, the received signal processing section 404 outputs the broadcast information, system information, RRC signaling, DCI and the like to the control section 401. Further, the received signal processing section 404 outputs the received signal and/or signal subjected to the reception processing to the measurement section 405.

The measurement section 405 performs measurement on the received signal. The measurement section 405 is capable of being comprised of a measurement device, measurement circuit or measurement apparatus explained based on the common recognition in the technical field according to the present invention.

For example, based on the received signal, the measurement section 405 may perform RRM measurement, CSI measurement and the like. The measurement section 405 may measure received power (e.g., RSRP), received quality (e.g., RSRQ, SINR), signal strength (e.g., RSSI), propagation path information (e.g., CSI), and the like. The measurement result may be output to the control section 401.

(Hardware Configuration)

In addition, the block diagrams used in explanation of the above-mentioned Embodiment show blocks on a function-by-function basis. These function blocks combination of hardware and/or software. Further, the method of actualizing each function block is not limited particularly. In other words, each function block may be actualized using a single apparatus combined physically and/or logically, or two or more apparatuses that are separated physically and/or logically are connected directly and/or indirectly (e.g., using cable and/or radio), and each function block may be actualized using a plurality of these apparatuses.

Figure 12:
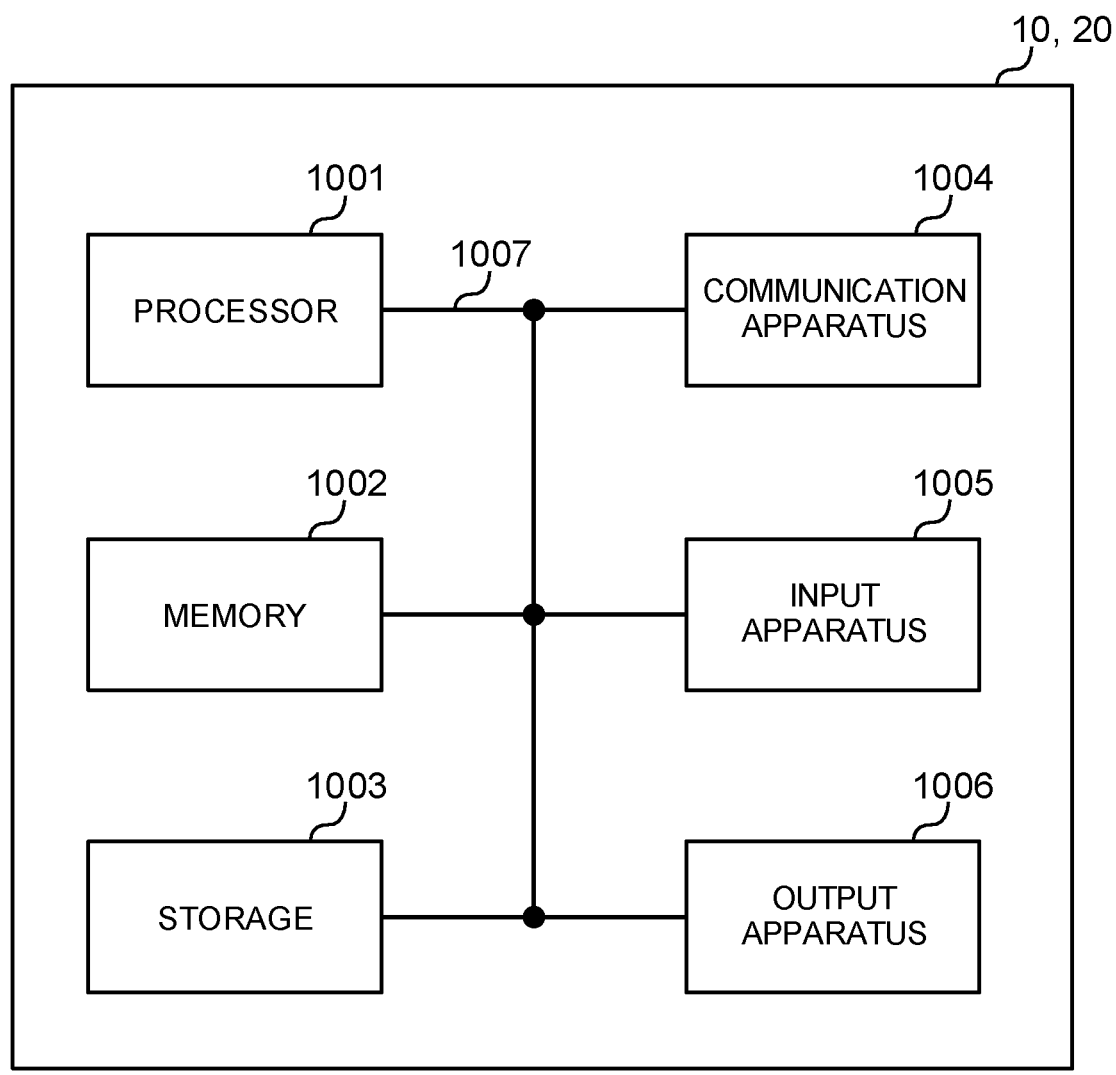
FIG. 12 is a diagram showing one example of hardware configurations of the radio base station and user terminal according to one Embodiment of the invention.

For example, each of the radio base station, user terminal and the like in one Embodiment of the present invention may function as a computer that performs the processing of the radio communication method of the invention. FIG. 12 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each of apparatuses shown in the figure, the hardware configuration of each of the radio base station 10 and the user terminal 20 may be configured so as to include one or a plurality of the apparatuses, or may be configured without including a part of the apparatuses.

For example, a single processor 1001 is shown in the figure, but a plurality of processors may exist. Further, the processing may be executed by a single processor, or may be executed by one or more processors at the same time, sequentially or using another technique. In addition, the processor 1001 may be implemented on one or more chips.

For example, each function in the radio base station 10 and user terminal 20 is actualized in a manner such that given software (program) is read on the hardware of the processor 1001, memory 1002 and the like, and that the processor 1001 thereby performs computations, and controls communication via the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, Floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses every inter-apparatus.

Furthermore, each of the radio base station 10 and user terminal 20 may be configured by including hardware such as a microprocessor, Digital Signal Processor (DSP), ASIC (ApplicatioN Specific Integrated Circuit), PLD (Programmable Logic Device), and FPGA (Field Programmable Gate Array), or apart or the whole of each function block may be actualized using the hardware. For example, the processor 1001 may be implemented using at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain. The one or the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may a time unit based on numerology. Moreover, the slot may include a plurality of mini-slots. Each mini-slot may be comprised of one or a plurality of symbols in the time domain. Further, the mini-slot may be called a subslot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel.8-12), normal TTI, long TTI, ordinary subframe, normal subframe, long subframe or the like. The TTI shorter than the ordinary TTI may be called reduced TTI, short TTI, partial or fractional TTI, reduced subframe, short subframe, mini-slot, subslot or the like.

In addition, the long TTI (e.g., normal TTI, subframe, etc.) may be read with TTI having a time length exceeding 1 ms, and the short TTI (e.g., reduced TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini-slot, 1 subframe, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), Resource Element Group (REG), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included inside the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present Description may be expressed using an absolute value, may be expressed using a relative value from a given value, or may be expressed using another corresponding information. For example, the radio resource may be indicated by a given index.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspect/Embodiments described in the present Description, and may be performed using another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of given information (e.g., notification of "being X") is not limited to explicit notification, and may be performed implicitly (e.g., notification of the given information is not performed, or by notification of different information).

The decision may be made with a value ("0" or "1") expressed by 1 bit, may be made with a Boolean value represented by true or false, or may be made by comparison with a numerical value (e.g., comparison with a given value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating one or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, operation performed by the base station may be performed by an upper node thereof in some case. In a network including one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term. Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description do not limit the amount or order of these elements overall. These designations are capable of being used in the present Description as the useful method to distinguish between two or more elements. Accordingly, references of first and second elements do not mean that only two elements are capable of being adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., search in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present Description, in the case where two elements are connected, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the present Description, the term of "A and B are different from each other" may mean that "A and B are mutually different". The terms of "separate", "coupled" and the like may be interpreted similarly.

In the present Description or the scope of the claims, in the case of using "including", "comprising" and modifications thereof, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiments described in the present Description. The invention is capable of being carried into practice as modified and changed aspects without departing from the subject matter and scope of the invention defined based on the descriptions of the scope of the claims. Accordingly, the descriptions of the present Description are intended for illustrative explanation, and do not have any restrictive meaning to the invention.

The invention claimed is:

1. A terminal comprising:
a receiver that receives a specified signal including a synchronization signal and a broadcast channel; and
a controller that controls a reception of a demodulation reference signal for a downlink shared channel while assuming that the demodulation reference signal does not collide with the specified signal,
wherein when a second resource of the demodulation reference signal collides with a first resource of a downlink channel, the controller uses a third resource for the reception of the demodulation reference signal and the third resource is obtained by shifting to a symbol after the first resource.

2. The terminal according to claim 1, wherein the second resource is in a start symbol of the downlink shared channel and the third resource is a result of shifting the second resource to the symbol immediately after the first resource.

3. The terminal according to claim 1, wherein a duration of the downlink shared channel is 7 symbols or less.

4. A radio communication method for a terminal comprising:
receiving a specified signal including a synchronization signal and a broadcast channel; and
controlling a reception of a demodulation reference signal for a downlink shared channel while assuming that the demodulation reference signal does not collide with the specified signal,
wherein when a second resource of the demodulation reference signal collides with a first resource of a downlink channel, the controlling uses a third resource for the reception of the demodulation reference signal and the third resource is obtained by shifting to a symbol after the first resource.

5. A base station comprising:
a transmitter that transmits a specified signal including a synchronization signal and a broadcast channel; and
a controller that controls a transmission of a demodulation reference signal for a downlink shared channel which does not collide with the specified signal,
wherein when a second resource of the demodulation reference signal collides with a first resource of a downlink channel, the controller uses a third resource for the transmission of the demodulation reference signal and the third resource is obtained by shifting to a symbol after the first resource.

6. A system comprising:
a terminal that comprises:
a receiver that receives a specified signal including a synchronization signal and a broadcast channel; and
a controller that controls a reception of a demodulation reference signal for a downlink shared channel while assuming that the demodulation reference signal does not collide with the specified signal; and
a base station that transmits the specified signal,
wherein when a second resource of the demodulation reference signal collides with a first resource of a downlink channel, the controller uses a third resource for the reception of the demodulation reference signal and the third resource is obtained by shifting to a symbol after the first resource.

* * * * *